(12) United States Patent  (10) Patent No.: US 9,058,330 B2
Kimmet et al.  (45) Date of Patent: Jun. 16, 2015

(54) VERIFICATION OF COMPLEX MULTI-APPLICATION AND MULTI-NODE DEPLOYMENTS

(71) Applicant: Wal-Mart Stores, Inc., Bentonville, AR (US)

(72) Inventors: Tim G. Kimmet, Los Gatos, CA (US); Ashwanth Fernando, Foster City, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 96 days.

(21) Appl. No.: 13/654,319

(22) Filed: Oct. 17, 2012

(65) Prior Publication Data

US 2014/0109082 A1 Apr. 17, 2014

(51) Int. Cl.
*G06F 9/445* (2006.01)
*G06F 11/30* (2006.01)
*G06F 9/455* (2006.01)

(52) U.S. Cl.
CPC ............. *G06F 11/3003* (2013.01); *G06F 8/60* (2013.01); *G06F 9/45533* (2013.01); *G06F 11/3051* (2013.01); *G06F 11/3082* (2013.01); *G06F 2201/815* (2013.01); *G06F 2201/83* (2013.01); *G06F 2201/865* (2013.01)

(58) Field of Classification Search
USPC ......................................................... 717/176
See application file for complete search history.

(56) References Cited

U.S. PATENT DOCUMENTS

| | | |
|---|---|---|
| 4,951,192 A | 8/1990 | Chase, Jr. |
| 5,574,898 A | 11/1996 | Allen |
| 6,195,795 B1 | 2/2001 | Block |
| 7,133,894 B2 | 11/2006 | Banerjee |
| 7,310,801 B2 | 12/2007 | Burkhardt |
| 7,581,217 B2 | 8/2009 | Jhanwar |
| 7,624,394 B1 * | 11/2009 | Christopher, Jr. .............. 717/177 |
| 7,747,998 B2 | 6/2010 | Napier |
| 7,992,050 B2 | 8/2011 | Melamed |
| 8,141,041 B2 * | 3/2012 | Williamson .................. 717/120 |
| 8,205,194 B2 | 6/2012 | Fries |
| 8,495,625 B1 * | 7/2013 | Sanders ........................ 717/177 |
| 8,522,207 B1 | 8/2013 | Whittington |
| 8,579,705 B1 | 11/2013 | Bond |
| 2003/0182652 A1 | 9/2003 | Custodio |
| 2007/0214028 A1 | 9/2007 | Stich |
| 2007/0271552 A1 * | 11/2007 | Pulley .......................... 717/120 |
| 2008/0120598 A1 | 5/2008 | Imeshev |
| 2008/0141240 A1 | 6/2008 | Uthe |

(Continued)

FOREIGN PATENT DOCUMENTS

WO WO2002025428 A3 2/2004

*Primary Examiner* — Hang Pan
(74) *Attorney, Agent, or Firm* — Bryan Cave LLP

(57) ABSTRACT

Systems and methods are disclosed for identifying software components stored on one or more virtual machines (VM). An installation directory is traversed and an ordered installation index of file paths and content identifiers are created for the files thereof. The installation index may be transmitted to a client that accesses artifact indexes for artifacts of software installed on the VMs. The artifact indexes include file paths and content identifiers for the fields of the artifact. Where all artifacts of a software package are found in the installation index, the package is deemed to be installed and a portal for accessing the VM may be updated to so indicate. The software packages found to be installed on a VM may be evaluated with respect to an application manifest to verify proper provisioning according to the manifest.

18 Claims, 5 Drawing Sheets

(56) References Cited

U.S. PATENT DOCUMENTS

2009/0217273 A1* 8/2009 Mutlu et al. .................. 718/101
2011/0296390 A1 12/2011 Vidal
2013/0007731 A1 1/2013 Fries

* cited by examiner

VERIFICATION OF COMPLEX MULTI-APPLICATION AND MULTI-NODE DEPLOYMENTS

BACKGROUND

1. Field of the Invention

This invention relates to systems and methods for managing an application installation and associated resources.

2. Background of the Invention

Today's applications are very complex both in terms of actual functionality and in the number of components that must interact in order to provide a computing service. In particular, applications often require various external resources to facilitate their operation. Often, these resources are standardized software modules or systems such as databases, web servers, and the like. The deployment of applications has also recently been facilitated by using commoditized services such as a "Platform as a Service" (PaaS) that provides the capability to provision the different artifacts of a computing platform on demand, such as an operating system, database, web server, file system, storage and network resources, where applications can be deployed. Typically the PaaS also interacts with an IaaS component to provision the virtual machines (or compute power) before the software can be deployed.

The following detailed description provides scalable and improved systems and methods for verifying the overall installation of a complex application including multiple software components and dependencies therebetween, across a set of virtual machines typical of software deployments in the cloud.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
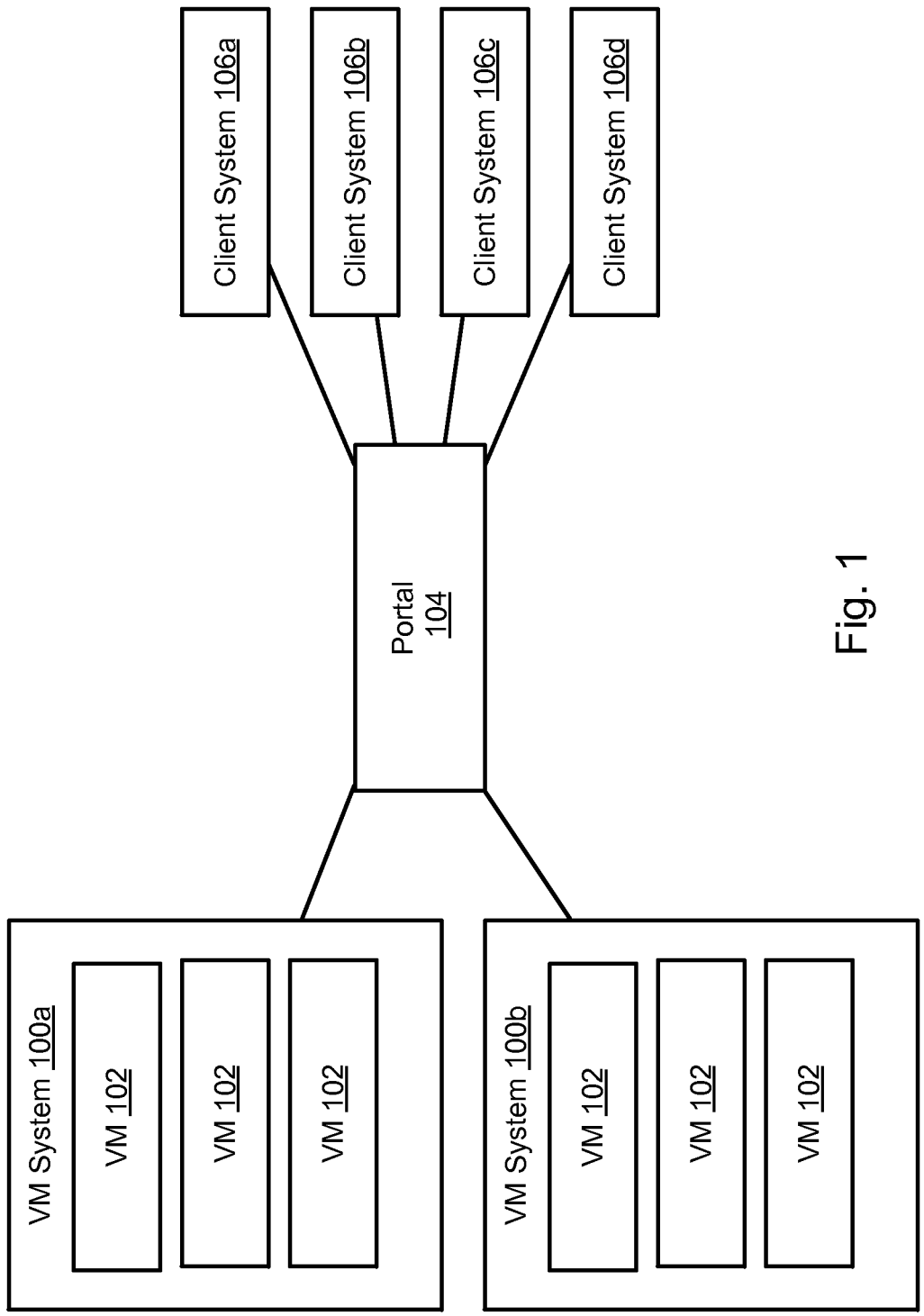
FIG. 1 is a schematic block diagram of a system for providing access to a plurality of virtual machines (VM)

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 illustrates components of a system, such as a PaaS system, that enables access to an application installation. The system may include one or more virtual machine (VM) systems 100a, 100b. A VM system 100a, 100b may include a single computer system, or may include a cluster of multiple computing devices. A VM system may host one or more VMs 102. Each VM 102 may host one or more applications and may host a complex system including multiple interacting software packages that depend on one another to provide proper functionality. Likewise, multiple VMs 102 of the same VM system 100a, 100b or different systems 100a, 100b may host software packages that are interactive with one another, dependent on one another, or otherwise dependent on one another to provide a platform (e.g. PaaS) or some other service. The software packages installed may be part of a PaaS system that provides multiple services and software packages that need to provide consistent and correct functionality of critical operations.

The VM systems 100a, 100b may be accessible may means of a portal 104. In some embodiments, the functionality of the portal 104 may be provided by a VM system 100a, 100b. For example, the portal 104 may be operably connected by any networking protocol or component attachment protocol to both the VM systems 100a, 100b and one or more clients 106a-106d. A client 106a-106d may be a set of virtual machines in itself having computational power and storage, running software shown in FIG. 3. In some embodiments, the ability to verify a software installation may exist as an action within the user interface of the portal 104. In some embodiments, a client 106a-106d may also automatically trigger verification of installation, through the portal 104, via a REST API call that the portal 104 would expose.

Figure 2:
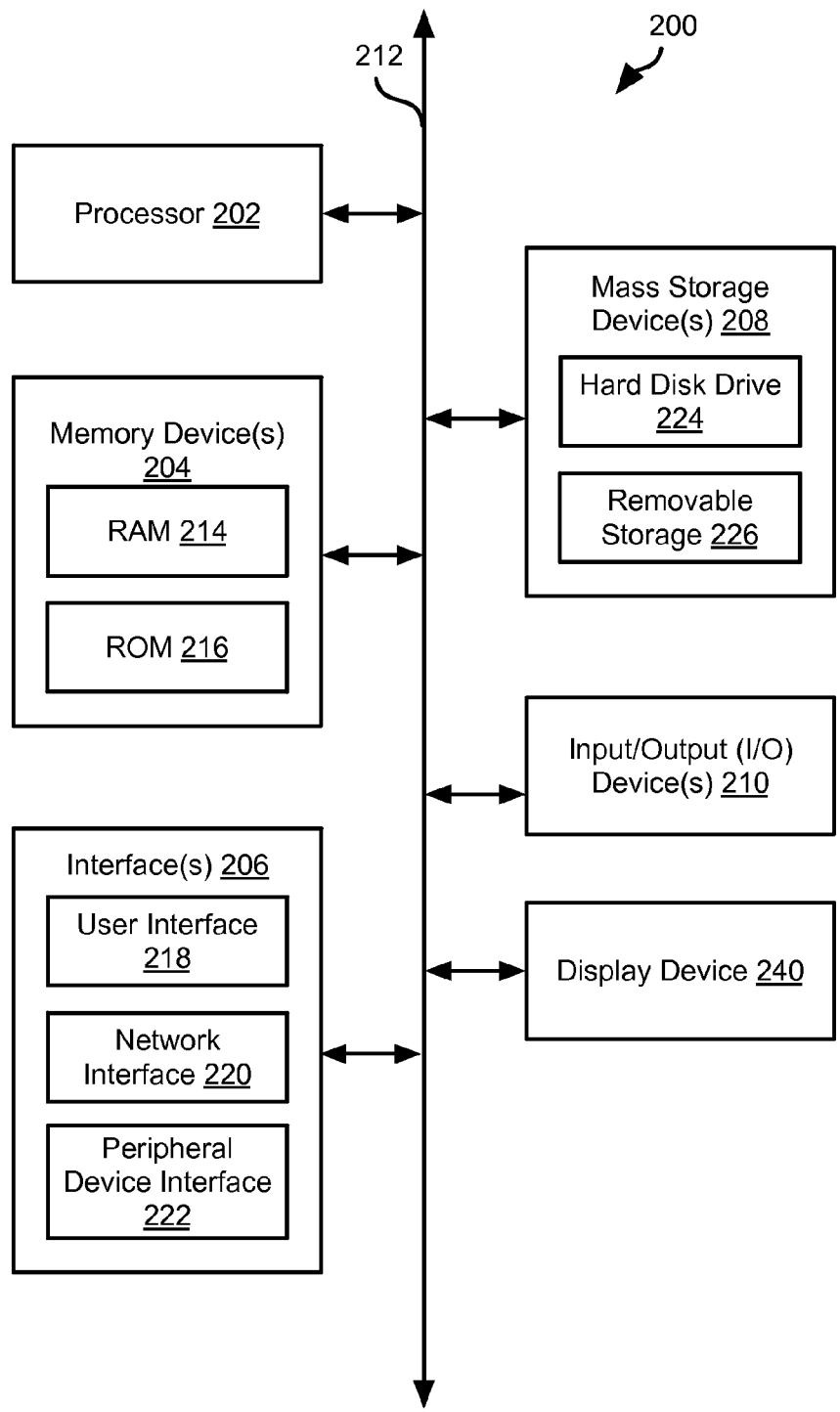
FIG. 2 is a block diagram of a computing device suitable for implementing embodiments of the present invention.

FIG. 2 is a block diagram illustrating an example computing device 200. Computing device 200 may be used to perform various procedures, such as those discussed herein. A VM system 100a, 100b, portal 104, and client system 106a-106d may be include some or all of the components of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
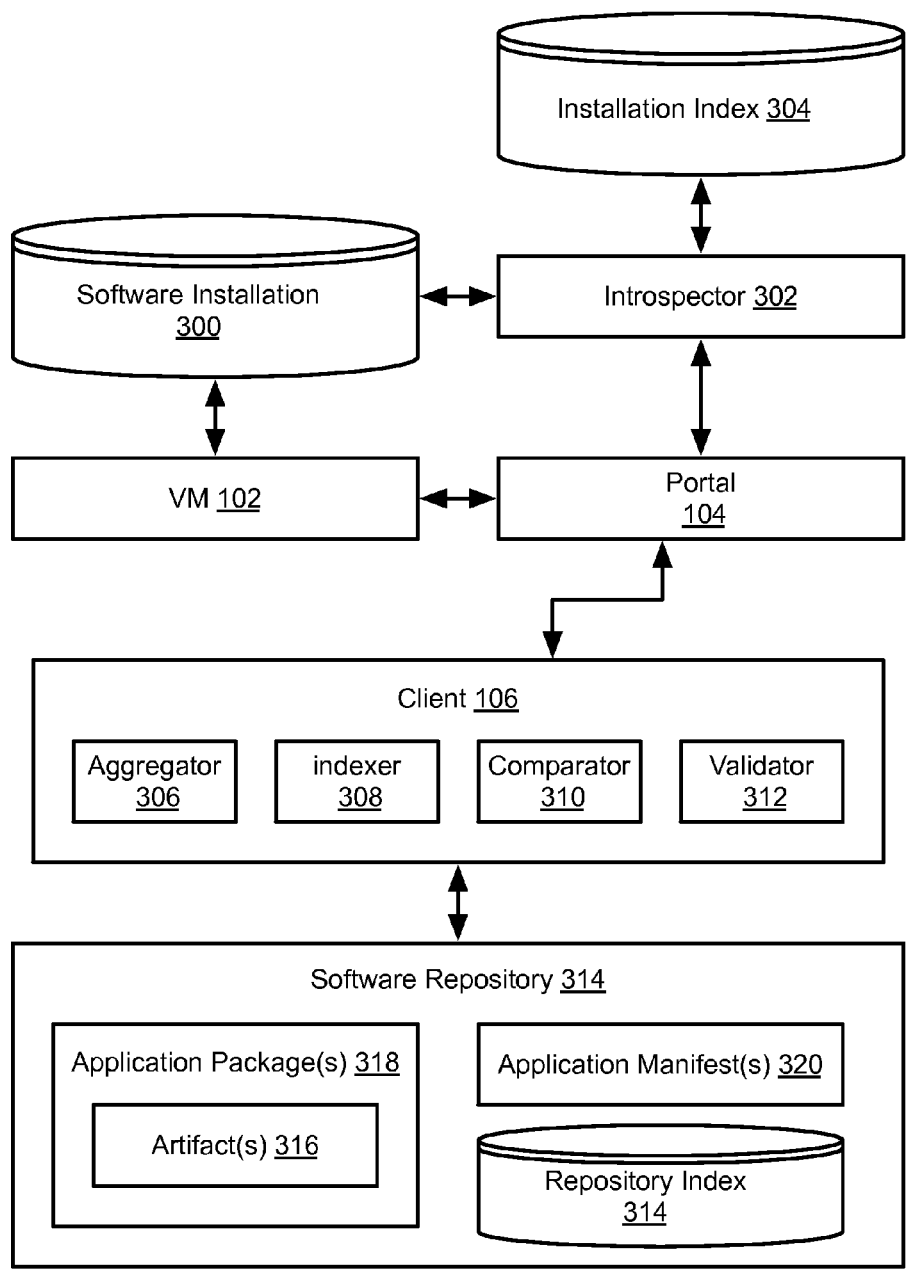
FIG. 3 is a schematic block diagram of a components for verifying an installation on a VM in accordance with an embodiment of the present invention.

FIG. 3 illustrates components for performing methods in accordance with embodiments disclosed herein. In particular, a software installation 300 for a VM 102 may be analyzed by an introspector 302. The introspector 302 may execute on the same VM system 100a, 100b as a VM 102 being analyzed by the introspector. In some embodiments, the introspector 302 may be included as part of an installation image including installation files for the VM 102. Alternatively, the introspector may execute on a different computer system that has access to storage device on which the software installation 300 is installed.

In some embodiment, the introspector 302 operates within a servlet container operating in the same or different computer system as a VM 102 being analyzed. The servlet may operate with permissions of a read-only user in some embodiments. In some embodiments, the servlet may be deployed at ROOT and therefore URLs exposed by the servlet may be perceived as a utility to the VM rather than as an application. The introspector 302 may operate within the servlet container to prove a web server-type functionality whereby the introspector 302 exposes a URL unique to a VM 102 and responds to HTTP requests at the URL with information as described below. The introspector 302, such as the servlet container hosting the introspector 302, may operate in a thread that is of low priority. The URL exposed to enable access to the introspector 302 may be an obscure port (e.g. somewhere in the higher ranges of ports within a computer system that is less than 65535) that is unlikely to carry production or payload traffic of the application that is installed on VM 102 corresponding to the introspector 302.

In particular, the introspector 302, by means of a URL or some other method, provides information from or access to an installation index 304. The installation index 304 is derived from the software installation 300. The software installation 300 may be organized as a directory tree such that the introspector 302 traverses the directory tree and adds entries to the installation index 304 for files encountered in the installation directory. For example, entries in the installation index 304 may be created by the introspector 302 that include some or all of the file path for a file in the software installation and a checksum, hash, or other value derived by the introspector 302 or some other component from the contents of the file and uniquely identifying the contents of the file.

The client 106 may communicate with the introspector 302 through the portal 104. This may be via a REST API that the portal 104 would expose. The client 106 may include one or more components or modules for performing methods disclosed herein. For example, the client 106 may include an aggregator 306, indexer 308, comparator 310, and a validator 312.

As noted above, software components that are dependent on one another may be hosted on different VMs 102 on different VM systems 100a, 100b. Accordingly, the aggregator 306 may be operable to request installation indexes from each VM 102 on each VM system 100a, 100b for which dependencies exist and for which evaluation is desired. As will be discussed in greater detail below, an "application manifest" may define a number of software components, which may include VMs themselves, that may be provisioned to support an application. The application manifest may be an application manifest as described in U.S. patent application Ser. Nos. 13/631,177; 13/631,203; 13/631,323, filed Sep. 28, 2012, which are hereby incorporated herein by reference in their entirety for all purposes. Accordingly, the aggregator 306 may request and receive installation indexes 304 for each VM 102 implicated by the application manifest as having a software component that was provisioned or otherwise allocated or used according to the application manifest.

The indexer 308 may be operable to characterize or otherwise analyze an installation repository 14. The indexer 308 may characterize all directories of the VM or only those that contain applications or application artifacts. An installation repository 314 may store one or more artifacts 316 that are part of one or more application packages 318. As known in the art, an artifact may include a collection of files or directory of files that has been packaged and/or compressed and may be used in one or more software packages. For example, an artifact 316 may be a .jar, .tar, .war, .ear file, or the like. The installation repository 314 may also store the application manifest 320. Alternatively, the client 106 may retrieve the application manifest 320 from another location for use in accordance with the methods disclosed herein.

The indexer 308 may generate a repository index 314 according to the analysis of the files of the installation repository 314. In some embodiments, artifacts 316 may be expanded and the files thereof may be analyzed. An index file may be generated for each artifact or for a group of artifacts corresponding to a specific application package 318.

Figure 5:
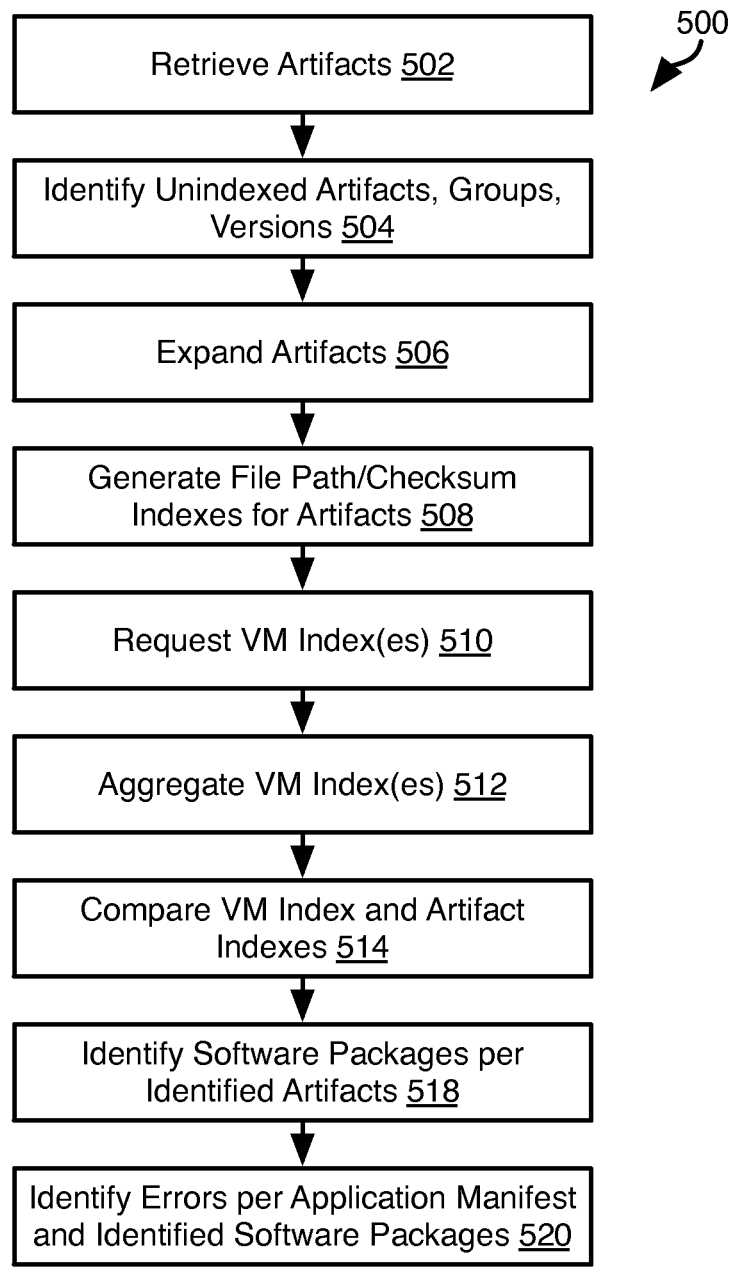
FIG. 5 is a process flow diagram of a method for verifying a software installation using a software repository in accordance with an embodiment of the present invention.

A comparator 310 evaluates the installation index 304, or installation indexes 304 from multiple VMs 102, with respect to the repository index and identifies software packages installed on the VMs 102 according to the comparison, such as according to methods described in further detail with respect to FIG. 5. A validator 312 compares identified application packages with those that are required according to the application manifest. If the validator 312 finds that a application package is not present, a report or some other alert indicating which application package is not present may be generated and stored or transmitted for display to an administrator.

Figure 4:
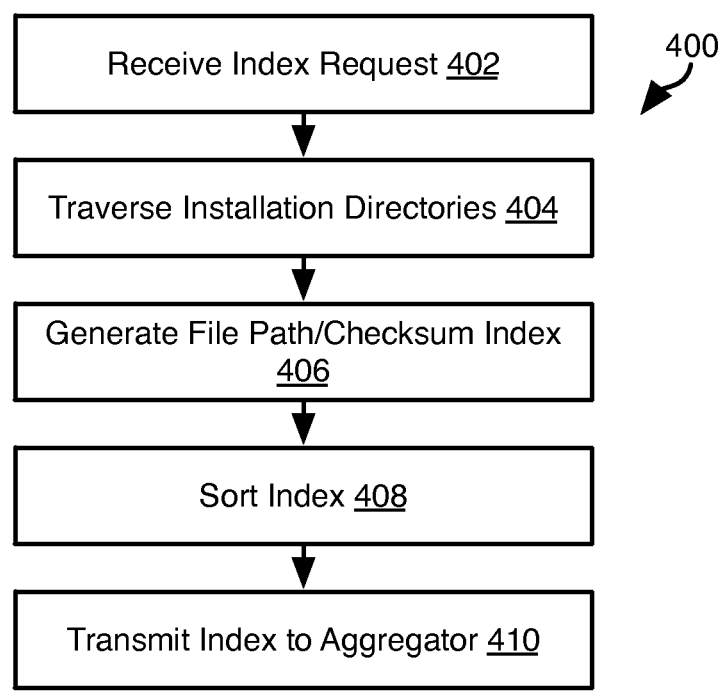
FIG. 4 is a process flow diagram of a method for providing an index of an installation on a VM in accordance with an embodiment of the present invention.

FIG. 4 illustrates a method 400 for generating an installation index for a VM. The method 400 may be executed by an introspector 302. The method 400 may include receiving 402 a request for an installation index for a VM 102 associated with the introspector 302. As noted above, this may include receiving an HTTP request at a URL exposed by the introspector 302.

In some embodiments, to avoid slowing production processing of the VM 102, only one request for an installation index will be processed at a time. Accordingly, when a request is received 402, a running flag may be evaluated. If the flag indicates that a previous request is still being processed, then the request received will be ignored. If the flag does not indicate that a previous request is being processed or when the received 402 request is retrieved from the queue, then the remainder of the method 400 may be executed with respect to the received 402 request. The remainder of the method 400 may be executed in a low priority thread. A low priority thread may be spawned in response to each received 402 request so as to not disrupt the production application that is possibly running on the VM 102.

Once a request 402 is selected for processing, the directories of a VM may be traversed 404 to identify files. The directory traversed may be rooted at a directory corresponding to the VM instance corresponding to the introspector 302 processing the request. Traversing 404 the directory may include traversing 404 the directory and identifying all file paths in the directory. The file paths may additionally be sorted, such as in ascending order. The file path may include the name of a file as well as the path in a directory to a starting directory for the instance.

Each file path may then be evaluated and the files in the file path processed to generate 406 an identifier uniquely identifying the file, such as a checksum or hash of the file. The generated content identifier may be stored in the installation index, such as in a <file path:checksum> pair. Once entries have been generated 406 for all files, the index may be sorted 408, such as in ascending order by file path. The method 400 may then include transmitting 410 the installation index to the requesting component, such as a client 106, or the aggregator 306 of a client 106.

FIG. 5 illustrates a method 500 such as may be executed by a client 106. The method 500 may include retrieving 502 artifacts from an installation repository 314. Typically an enterprise maintains an artifact repository that is used to store artifacts that are deployed on virtualized images (e.g. VMs 102). For example, an installation repository 314 may be embodied as a Maven repository implementation, such as Sonatype Nexus. An artifact typically includes a collection of files, which may be arranged in a directory. Typically the directory structure of the files within the artifact is the same as the directory structure of the files when installed on a node.

The method 500 may include identifying 504 unindexed artifacts, groups of artifacts, or versions of artifacts. This may include identifying those software packages, artifact groups, or individual artifacts were not previously indexed. In some embodiments, once a software package, artifact group, or artifact is indexed according to the method 500, a record of this fact and a file path of the artifact may be recorded in a persistent file or "artifact map" that is referenced when performing the method 500. Accordingly, identifying 504 unindexed artifacts may include comparing artifacts, software packages, groups of artifacts present in a repository to this persistent file.

For those artifacts that have been identified 504 as unindexed, the method 500 may include expanding 506 the artifacts. This may include extracting the artifacts using a decompression algorithm where the artifacts have been compressed. Expanding 506 an artifact may additionally include extracting the files and directories of the artifact from any package format used to create the artifact. Once an artifact is expanded, an artifact index may be generated 508 for the files of each artifact. This may include generating an index file including, for each file of the artifact, a file path (which may include the file name) and a content identifier for each file in the artifact. The file path may include the file path in accordance with the directory structure that was preserved within the artifact and may include parent directories of the artifact itself. The content identifier may be any code that uniquely identifies the content of the file, such as a checksum or hash. The artifact index may be stored or referenced under a title that includes one or more of a group identifier for a group to which the identifier belongs, the name of the artifact, and a version number of the artifact.

In some embodiments, steps 502-508 may be repeated periodically and independent of any particular request to verify the installation on a VM 102. For example, standalone process may be initiated every N days to perform steps 502-508 with respect to a repository. For example, a standalone java class may be instantiated through a job scheduler to perform steps 502-508 with respect to an installation repository every N days, e.g., every two days.

The remainder of the method 500 may also be performed periodically or may be invoked by a user or some other software component in response to detection of failure to determine whether a cause of the failure was due to improper installation. For example, the method 500 may include requesting 510 and receiving the installation indexes from one or more VMs 102. For example, installation indexes may be requested from all VMs 102 having software components executing thereon that are part of an interdependent system, such as one provisioned or defined according to an application manifest. The aggregator 306 may generate the requests. As noted previously, the introspector 302 may expose a URL and operate as a web server. Accordingly, requesting 510 installation indexes may include requesting the URL corresponding to a particular VM 102. As known in the art of HTTP protocol, the process requesting the URL may be configured asynchronously such that the client 106 does not block while waiting for the installation indexes from the introspector 302.

The received installation indexes may be aggregated 512 and compared 514 to the repository index, such as a repository index that has been previously generated 508. Comparing 514 the indexes may include attempting to identify each of the files of each artifact of each software package. If all the files for a software package or group of artifacts are found to be represented in the installation indexes, or an aggregation of installation indexes, the software package or group may be deemed to have been installed successfully. If not, then the software package or group may be deemed not to have been installed.

In some embodiments, a persistent file stores an artifact map that is updated or generated during the generation 508 of the repository index. The repository map may store a file path (including file name) for the artifacts that were previously indexed. For each of these entries, the installation index, or aggregation of installation indexes, may be searched to identify the entry in the installation index or aggregation of installation indexes.

If the file path of an artifact recorded in the artifact map is found in the installation index, then the artifact index (i.e, the artifact with the correct group identifier, artifact identifier, and version identifier) corresponding to that file path may be retrieved and the installation index may be searched to identify the entries of the artifact index in the installation index. If all entries of the artifact index are found (e.g. a checksum corresponding to the files of the artifact index were found in the installation index), then the artifact may be deemed to be properly installed, if not, then the artifact is deemed not to have been installed. Inasmuch as the indexes (artifact index and installation index) may have been sorted, if a particular file is not found in the expected place in the listing of files in the installation index, further search for the files of an artifact index may be stopped. As soon as the files of an artifact have been mapped to entries of the installation index, those entries may be removed from the installation index in order to reduce searching time for subsequent artifacts. The file paths of the artifact map may be continue to be evaluated until no more matches are found in the installation index.

In some embodiments, where multiple instances of the same application, VM, or VM image (including one or more installed software components) are installed on multiple VMs, evaluating of the installation indexes corresponding thereto may be accelerated. For example, once a first installation index has been compared to the repository index, a second installation index for an identical image may be evaluated by comparing the checksum thereof to the checksum of the first installation index. If they are not identical, then the second installation index may be compared 514 to the repository index as described above to identify any artifacts that may be missing.

Once all of the entries of the artifact map have been found to be absent in the installation index or the corresponding artifact indexes compared to the installation index, then any artifacts found to be completely present may be evaluated to identify 518 software packages that were found to be installed on the VM 102 or VMs 102 from which installation indexes were received. This may include comparing the identifiers of artifacts found to lists or groupings of artifacts corresponding to a particular software package. If all artifacts for a software package are found to be present then the software package may be deemed to be installed, otherwise not. Where some but not all artifacts of a software package are found to be present, the absent artifacts thereof may be reported or recorded for later diagnosis.

In some embodiments, a portal 104 by which a VM 102 is accessed maintains, for each VM 102, a record of all software installed on a VM 102. Accordingly, once the identity of software properly installed on a VM 102 has been identified 518, the records used by the portal 104 may be updated to reflect the software identified 518 for each VM 102 accessed thereby.

In some embodiments, the list of identified 518 software for a VM 102 may be compared to an expected list of software. Where a software package is absent or not properly installed, then errors or alerts may be generated and transmitted for display to a user and/or saved for later diagnosis. Where VM 102 or group of VMs 102 are provisioned or set up according to an application manifest, the identified 518 may be evaluated with respect to the application manifest to identify 520 whether the software to be provisioned according to the manifest was actually installed on the one or more VM 102. Where a software component is found not to have been installed properly, a report or alert may be generated and transmitted for display to an operator and/or stored for later diagnosis.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for verifying an installation, the method comprising:
    processing contents of a plurality of software packages effective to generate installations of the plurality of software packages on one or more virtual machines;
    for each virtual machine of the one or more virtual machines, traversing a corresponding installation directory of the each virtual machine and generating an installation index of content identifiers for files found in the installation directory, the files being a result of processing the plurality of software packages to install the plurality of software packages on the each virtual machine;
    transmitting one or more installation indexes for the one or more virtual machines to a monitoring client;
    generating, by the monitoring client, a repository index including software indexes, by, for each software index, populating the each software index with content identifiers for files by analyzing the contents of a corresponding software package of the plurality of software packages, the corresponding software package including files and instructions effective to install the corresponding software package;
    identifying, by the monitoring client, first software packages for which not all of the content identifiers of a corresponding software index of the software indexes are found in the installation index; and
    reporting, by the monitoring client, a status of the one or more virtual machines in accordance with the first software packages including reporting that the first software packages were not installed correctly;
    wherein transmitting the one or more installation indexes for the one or more virtual machines to the monitoring client is performed in one or more servlets corresponding to the one or more virtual machines in response to requests from the monitoring client for uniform resource locators corresponding to the one or more virtual machines.

2. The method of claim 1, wherein each installation index includes a file path corresponding to each content identifier included in each installation index.

3. The method of claim 1, wherein each content identifier is a checksum for a corresponding file.

4. The method of claim 1, wherein traversing the corresponding installation directory for each of the one or more virtual machines is performed in a low priority thread.

5. The method of claim 1, further comprising generating the installation index by, for each software package:
    expanding artifacts corresponding to the software package; and
    generating the software index including content identifiers for files of the expanded artifacts.

6. The method of claim 5, wherein generating the software index further includes labeling the software index with a package identifier and version identifier of the corresponding software package.

7. The method of claim 6, further comprising including a path in the software index for each content identifier for files of the corresponding software package.

8. The method of claim 7, wherein reporting the status of the one or more virtual machines in accordance with the first software packages further comprises:
    evaluating the first software package with respect to an application manifest defining an interdependent installation of software packages; and
    reporting any errors in accordance with the evaluation.

9. The method of claim 1, wherein the one or more virtual machines include a plurality of virtual machines, the method further comprising:
    transmitting, by the monitoring client, requests for installation indexes from the plurality of virtual machines;
    aggregating installation indexes received from the plurality of virtual machines; and
    wherein identifying software packages for which not all of the content identifiers of the corresponding software index are found in the installation index comprises analyzing the aggregated installation indexes.

10. A system for verifying an installation, the system comprising:
    one or more virtual machine (VM) computer systems each having one or more processors and hosting one or more virtual machines, each of the one or more VM computer systems programmed to, for each virtual machine of the one or more virtual machines hosted thereby:
        process contents of a plurality of software packages effective to generate installations of the plurality of software packages on the each virtual machine;
        traverse a corresponding installation directory and generating an installation index of content identifiers for files found in the installation directory for the each virtual machine;
        transmit the one or more installation indexes for the one or more virtual machines to a monitoring client;
    a monitoring client system programmed to:
        generate a repository index by generating software indexes, by, for each software index, analyzing contents of a corresponding software package of the plurality of software packages as executed to install the corresponding software package and adding identifiers for files stored in the corresponding software package to the each software index, the corresponding software package including files and instructions effective to install the corresponding software package;

identify one or more first software packages for which all of the content identifiers of a corresponding software index are found in the installation index; and report a status of the one or more virtual machines of the one or more VM computer systems in accordance with the one or more first software packages including reporting that the one or more first software packages were not installed correctly;

wherein the one or more VM computer systems are each further programmed to transmit the one or more installation indexes for the one or more virtual machines to the monitoring client using a servlet corresponding to the one or more virtual machines in response to requests from the monitoring client for uniform resource locators corresponding to the one or more virtual machines.

11. The system of claim 10, wherein each installation index includes a file path corresponding to each content identifier included in each installation index.

12. The system of claim 10, wherein each content identifier is a checksum for a corresponding file.

13. The system of claim 10, wherein the one or more VM computer systems are further programmed to traverse the corresponding installation directory for each of the one or more virtual machines is performed in a low priority thread.

14. The system of claim 10, wherein the monitoring client system is further programmed to generate the installation index by, for each software package:

expanding artifacts corresponding to the software package; and generating the software index including content identifiers for files of the expanded artifacts.

15. The system of claim 14, wherein the monitoring client system is further programmed to generate the software index by labeling the software index with a package identifier and version identifier of the corresponding software package.

16. The system of claim 15, wherein the monitoring client system is further programmed to include a path in the software index for each content identifier for files of the corresponding software package.

17. The system of claim 16, wherein the monitoring client system is further programmed to report the status of the one or more virtual machines in accordance with the one or more first software packages by:

evaluating the one or more first software package with respect to an application manifest defining an interdependent installation of software packages; and reporting any errors in accordance with the evaluation.

18. The system of claim 10, wherein the one or more virtual machines include a plurality of virtual machines, and the monitoring client is further programmed to:

transmit requests for installation indexes from the plurality of virtual machines;

aggregate installation indexes received from the plurality of virtual machines; and identify software packages for which all of the content identifiers of the corresponding software index are found in the installation index comprises analyzing the aggregated installation indexes.

* * * * *